(12) United States Patent
Williams et al.

(10) Patent No.: US 8,995,788 B2
(45) Date of Patent: Mar. 31, 2015

(54) SOURCE IMAGERY SELECTION FOR PLANAR PANORAMA COMPRISING CURVE

(75) Inventors: Samuel Williams, Redmond, WA (US); Jonathan Rosenberg, Redmond, WA (US); Johanness Kopf, Bellevue, WA (US); Don Kim, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 468 days.

(21) Appl. No.: 13/325,612

(22) Filed: Dec. 14, 2011

(65) Prior Publication Data

US 2013/0156326 A1    Jun. 20, 2013

(51) Int. Cl.
*G06K 9/36* (2006.01)
*G06T 11/00* (2006.01)
*H04N 5/232* (2006.01)

(52) U.S. Cl.
CPC ................................. *H04N 5/23238* (2013.01)
USPC .......................................... 382/284; 382/294

(58) Field of Classification Search
None
See application file for complete search history.

(56) References Cited

U.S. PATENT DOCUMENTS

| | | | |
|---|---|---|---|
| 6,064,399 A | | 5/2000 | Teo |
| 6,075,905 A * | | 6/2000 | Herman et al. ................ 382/284 |
| 6,665,003 B1 * | | 12/2003 | Peleg et al. ..................... 348/36 |
| 7,110,592 B2 | | 9/2006 | Kotake |
| 7,840,032 B2 | | 11/2010 | Ofek |
| 2006/0120625 A1 * | | 6/2006 | Peleg et al. .................... 382/284 |
| 2007/0103544 A1 * | | 5/2007 | Nakazawa ....................... 348/38 |
| 2007/0122058 A1 | | 5/2007 | Kitaura |
| 2008/0043020 A1 | | 2/2008 | Snow |
| 2010/0118116 A1 | | 5/2010 | Tomasz |
| 2010/0201682 A1 | | 8/2010 | Quan |
| 2010/0302280 A1 | | 12/2010 | Szeliski |
| 2012/0294549 A1 * | | 11/2012 | Doepke ......................... 382/294 |

OTHER PUBLICATIONS

Yining Deng et al., "Generating Panorama Photos", Proceedings of SPIE vol. 5242 Internet Multimedia Management Systems IV, (SPIE, Bellingham, WA, 2003), pp. 270-279.*

Zheng, Jiang Yu, "Stabilizing Route Panoramas"—Published Date: Aug. 23-26, 2004, Proceedings: 17th International Conference on Pattern Recognition, vol. 1, http://www.cs.iupui.edu/~jzheng/deshaking.pdf.

* cited by examiner

*Primary Examiner* — Brian P Werner
(74) *Attorney, Agent, or Firm* — Steven Spellman; Jim Ross; Micky Minhas (57) ABSTRACT

Among other things, one or more techniques and/or systems are disclosed for selecting source imagery for a planar panorama comprising a curved path. The curved path can be identified in a block of source imagery, where the source imagery comprises inside-curve source imagery for an inside curve of the curved path. Image data from a first source image from the inside-curve source imagery can be compared with image data from a second source image from the inside-curve source imagery. If image data of the first source image sufficiently overlaps image data of the second source image the first source image can selected for inclusion in a set of images to be used for the planar panorama, while the second source image may not be so selected (e.g., to mitigate artifacts, object overlap, repeated objects, etc. in the planar panorama).

20 Claims, 8 Drawing Sheets

SOURCE IMAGERY SELECTION FOR PLANAR PANORAMA COMPRISING CURVE

BACKGROUND

Digital photography can allow for a sequence of images to be stitched or glued together to provide for a relatively seamless transition from one image to the next. Further, images, such as side-view images, can be collected while traveling along a route, such as a street. Stitching these side-view images together can provide a user experience of travelling along the route, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A side or lateral-view of panoramic imagery may comprise a series of images (e.g., photo frames, video frames, etc.) stitched/merged together to form a somewhat seamless view of the imagery. This type of planar panorama imagery typically displays many of the stitched together images at a same time. Currently, images stitched together in this manner can be utilized in conjunction with digital mapping services, where, for example, a user may view planar panorama-type images of a street associated with a map they may be viewing.

As provided herein, particular care may be taken when generating a planar panorama for curves in a pathway (e.g., bends, intersections, switchbacks and/or roundabouts, etc.). For example, if a bend in a road is rather sharp, there may be superfluous/duplicate imagery for an inside of the curve.

Accordingly, among other things, one or more techniques and/or systems are disclosed that may be used to (desirably) select imagery for a planar panorama, from a set of source imagery, so as to be able to address the geometry of a curve in a path. Image data from a set of source imagery, comprising an inside of a curve, can be analyzed to identify "common" image data. Common image data may comprise image data that is shared between adjacent (e.g., or relatively consecutive) images in the source imagery. If the analysis determines that enough image data is shared between adjacent images, one or more images can be withheld from a set of images used for an inside-curve portion of a planar panorama.

In one embodiment for selecting source imagery for a planar panorama comprising a curved path, a block of source imagery may be received. A curved path may be identified in the block of source imagery, where the curved path comprises inside-curve source imagery. A first source image may be selected from the inside-curve source imagery for the planar panorama if image data from the first source image is comprised in (e.g., overlaps) image data from a second source image from the inside-curve source imagery, where the second source image is not then selected.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for identifying valid, appropriate source images for a planar panorama that comprises a curved pathway. When street-level, human-scale images are collected along a roadway, for example, that comprise a curve, the resulting planar panorama of the roadway may utilize less imagery from the inside of the curve than from the outside of the curve. Image data from the imagery on the inside of the curve can be analyzed to identify those images that may comprise an overlap of image data. Where one or more images cover the respective data from another image, for example, the covered image may be not be selected for the resulting planar panorama (e.g., to mitigate redundant, compressed, etc. data).

Figure 1:
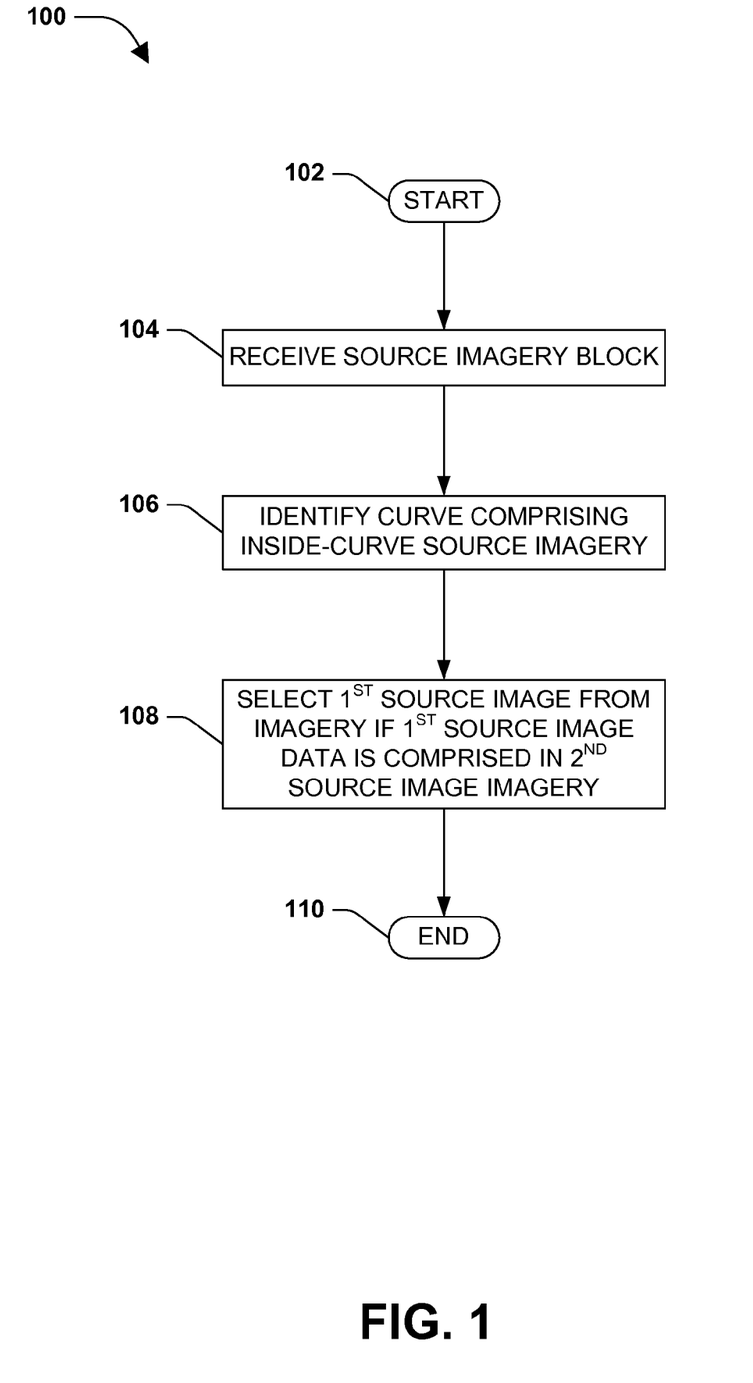
FIG. 1 is a flow diagram illustrating an exemplary method for selecting source imagery for a planar panorama comprising a curved path.

FIG. 1 is a flow diagram illustrating an exemplary method for selecting source imagery for a planar panorama comprising a curved path. The exemplary method 100 begins at 102. At 104, a block of source imagery is received. Source imagery can comprise a relatively sequential group of images, for example, which may comprise human-scale, street-level images collected along a roadway at desired intervals, for example. Further, the block of source imagery may comprise a portion of a path, for example, that comprises a logical section of the roadway (e.g., between intersections).

Additionally, the block can comprise a first set of imagery from a first side of the pathway, and a second set of imagery from a second side of the pathway. That is, for example, for the imagery collected at desired intervals along a roadway, images can be collected of both sides of the roadway (e.g., left and right) when travelling along the roadway. In this way, for example, the first set of imagery can comprise images of the right side, and the second set of imagery can comprise images of the left side of the roadway.

At 106 in the exemplary method 100, a curved path can be identified in the block of source imagery, where the curved path may comprise inside-curve source imagery. As one example, a curve comprises an inside and an outside. Further, in this example, because the block of source imagery can comprise a first set of imagery and second set of imagery (e.g., from the left and right sides of the roadway) at least one of the first set and the second set can comprise the inside-curve source imagery (e.g., depending on which way the curve turns, to the left or to the right).

At 108, a first source image is selected from the inside-curve source imagery for inclusion in the planar panorama, if image data from the first source image is comprised in a second source image from the inside-curve source imagery. As one example, the image data can comprise objects within a viewing area comprised within a field of view from an observation location for an image. That is, for example, a field of view (e.g., one-hundred and twenty degrees) for an image capture device can determine a width of the viewing area for an image captured by an image capture device. In this example, the viewing area can thereby determine how much image data (e.g., objects) may be comprised in the image (e.g., along with a distance between objects and the observation location).

Further, when images are collected at desired intervals along the inside of a curve, for example, adjacent images may comprise a substantial amount (e.g., or all) of the same image data. As one example, the viewing area of adjacent images around an inside curve may overlap significantly, depending on the field of view (e.g., a wider field of view may produce a greater overlap of viewing areas). In this example, if the first image covers a desired amount of image data from the second image, the first image may be selected for inclusion in the planar panorama, and the second image may not be utilized (e.g., may not be needed) for the planar panorama. In this way, for example, less data may be needed and/or a potential for distortion (e.g., repeated objects, misaligned objects) may be mitigated when stitching images together to create the planar panorama. Having selected the first source image from the inside-curve imagery for the planar panorama, the exemplary method 100 ends at 110

Figure 2:
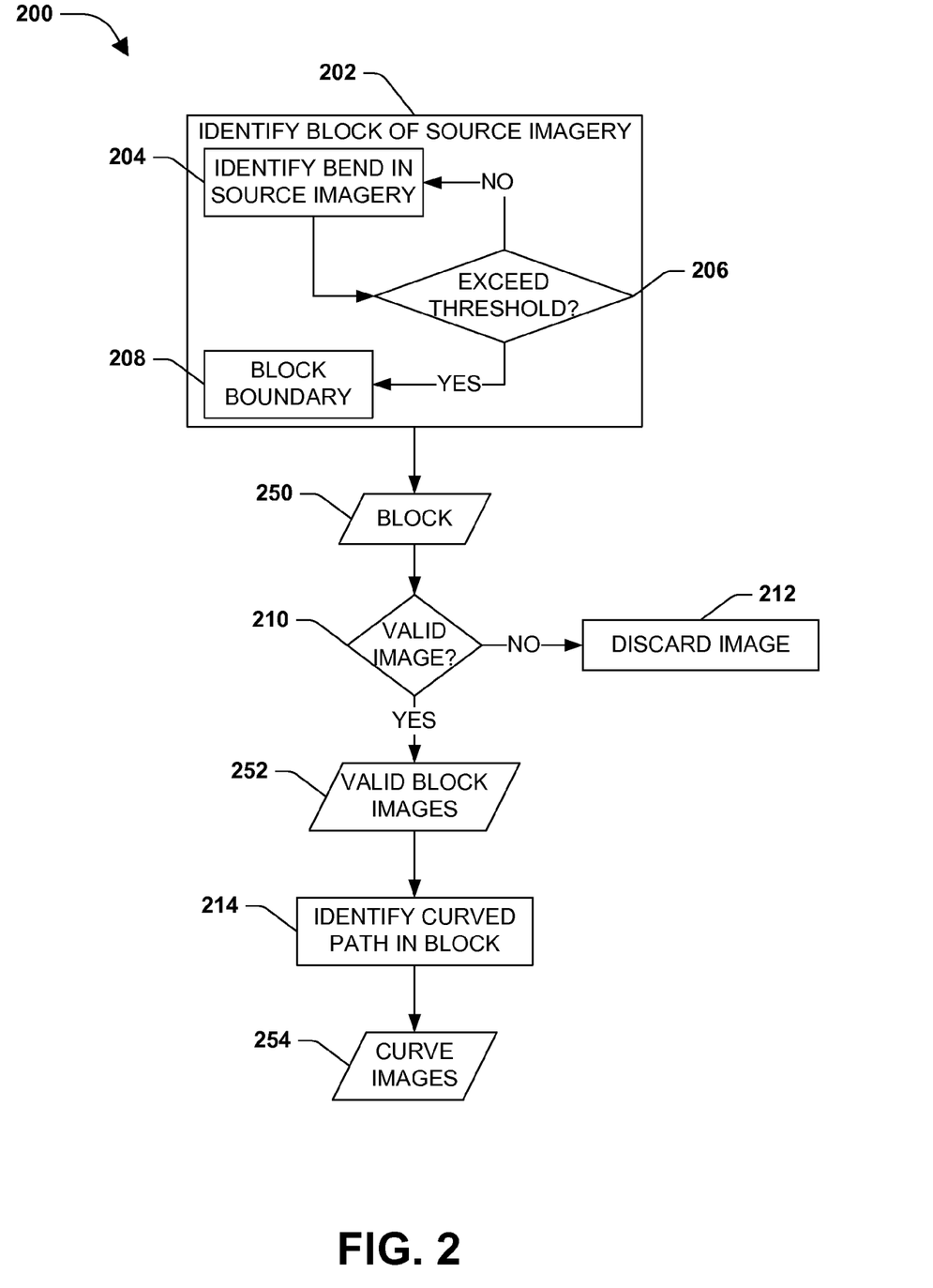
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. At 202, a block of source imagery 250 may be identified. In one embodiment, the block of source imagery 250 can comprise at least a section of a path without a bend exceeding a desired bend threshold. That is, for example, if the source imagery comprises a path that bends too sharply, a resulting planar panorama (e.g., used in conjunction with a mapping application) may provide a less than desirable user experience (e.g., distorted objects in the imagery, confusing views of the inside portion of the bend, etc.).

At 204, identifying the block of source imagery can comprise identifying a bend in the source imagery. As one example, a bend may comprise a deviation from a relatively straight path (e.g., along a roadway). For example, an intersection, tee, an S-curve, switch-back, a hair-pin turn, and/or some other turn, may comprise a bend. In one embodiment, the bend may be identified using street mapping data, such as from a street mapping database, where the path comprised in the block of source imagery 250 can be compared with a corresponding path in the street mapping data, for example.

At 206, the identified bend may be compared to a desired bend threshold to determine whether the identified bend exceeds the desired bend threshold. As one example, a bend threshold may be determined using empirical data (e.g., from previous attempts at creating a planar panorama using imagery from a bend), where exceeding the bend threshold may result in undesired planar panorama imagery. A bend may be identified, for example, by an angle of deflection of a deviating portion of the path from an initial path, by an angle of deflection to distance (e.g., travelled) ratio for a deviating portion of the path from an initial path, by an arc measurement of the identified bend, and/or by some other means of quantifying a bend. The quantification of the identified bend can be compared with the desired bend threshold to determine if the threshold is exceeded.

If the desired bend threshold is not exceeded (NO at 206), a next bend may be identified in the source imagery, at 204. If the desired bend threshold is exceeded (YES at 206), the identified bend can comprise a boundary for a resulting block of source imagery 250, at 208. As one example, a first identified bend that exceeds the desired bend threshold may comprise a first boundary (e.g., a first end) of the resulting block 250 comprising a pathway, and a second identified bend that exceeds the desired bend threshold may comprise a second boundary (e.g., a second end) of the block 250. That is, for example, the resulting block of source imagery 250 may comprise a pathway that has an excessive bend (e.g., exceeding the desired bend threshold) at either end.

In one embodiment, the block of source imagery 250 can comprise images from a first side of a pathway, and images from a second side of the pathway. That is, for example, the block of source imagery 250 may comprise a set of images of a right side of a roadway, and a set of images of a left side of the roadway. Further, as one example, image quality for respective images in the block of source imagery 250 may vary depending on a variety of factors (e.g., objects moving, objects obscuring portions of the image, a position of the image capture device, malfunctions, etc.).

In one embodiment, image quality may be validated, for example, to determine whether an image may be useable in the resulting planar panorama. At 210, respective images from the first side and from the second side, in the block of source imagery 250, can be validated. In one embodiment, validating can comprise determining whether a source image comprises image data that is valid for use in the planar panorama (e.g., the image quality meets a desired quality threshold). If the image is not valid for use in the planar panorama (NO at 210), the image may not be used in the planar panorama, at 212.

If the image is valid for use in the planar panorama (YES at 210), the image may be used in a block of valid source imagery 252. At 214, a curved path may be identified in the block of valid source imagery 252. In one embodiment, the curved path may be identified using a road network database. As an example, a road network database may be utilized by a mapping application (e.g., for an online map service, mobile navigation system, GPS device, etc.), detailing locations and routes of roads, etc. In this example, the road network database may also be used to determine when a roadway curves (e.g., deviates from a relatively straight path), by reviewing road map information.

In one embodiment, the curved path may be identified using geo-location data comprised in the block of source imagery. As an example, when the source imagery is collected, a geo-location of the corresponding capture location can also be collected. In this way, for example, a curve may be identified by an arrangement (e.g., deviation from a relatively straight path) of relatively consecutive geo-locations for the corresponding imagery.

As a result of identifying one or more curved paths in the block of valid source imagery 252, one or more sets of source imagery for corresponding curves 254 may be identified. In one embodiment, respective sets of source imagery for corresponding curves 254 may comprise a set of images for a first side of a curved roadway (e.g., a view of the inside of the curve), and a set of images for a second side of the curved roadway (e.g., a view of the outside of the curve).

Figure 3:
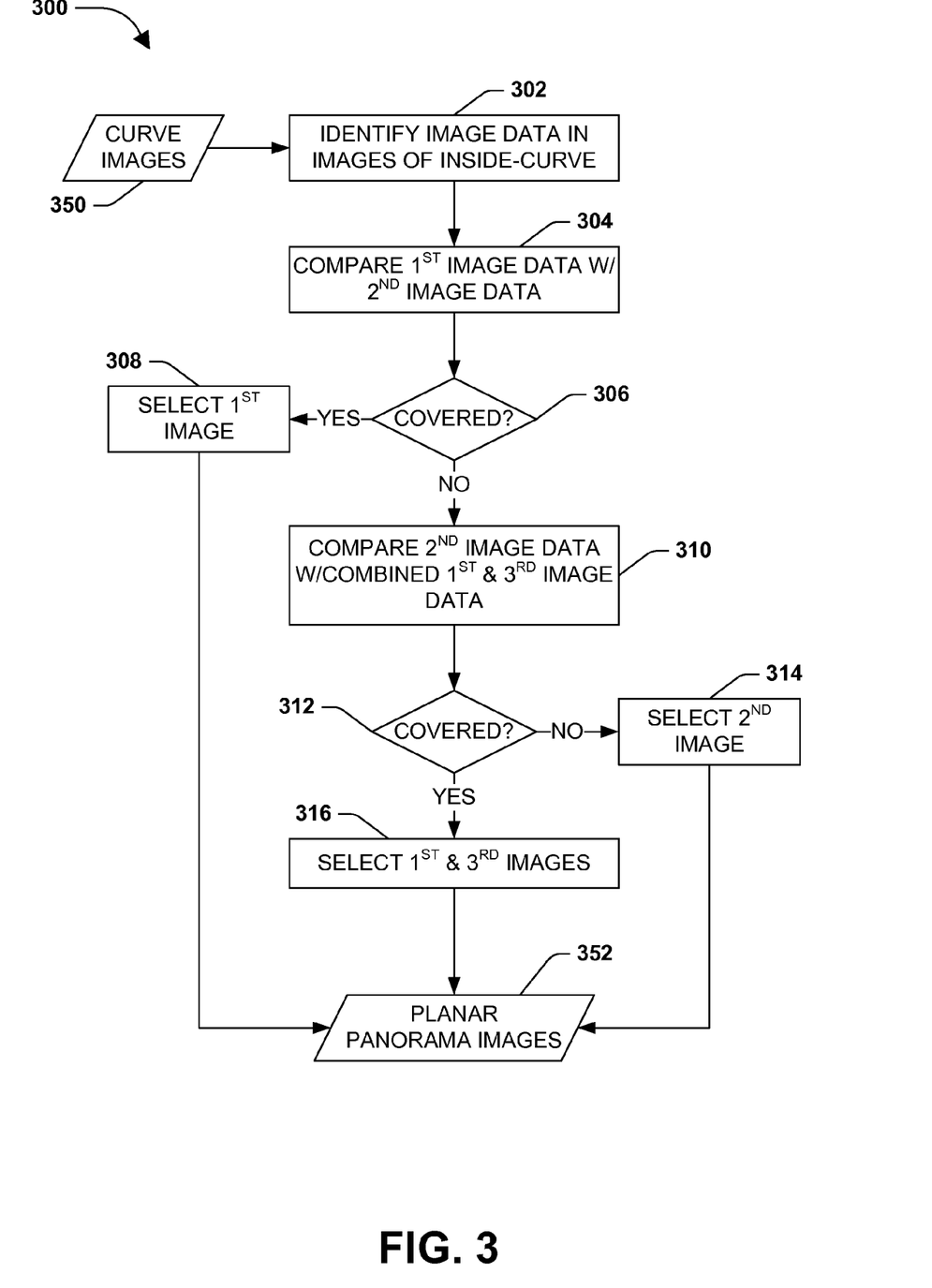
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented (e.g., picking up from 254 in FIG. 2). At 302, image data may be identified in source imagery for an inside portion of one or more curves 350 identified in the source imagery (e.g., in inside-curve source imagery). As one example, the image data for an image may comprise objects (e.g., buildings, scenery, landscaping, people, signs, etc.) captured by an image capture device used to collect the image. For example, object detection may be used to identify one or more objects and/or respective locations of one or more objects in the image.

At 304, image data from a first image comprised in inside-curve source imagery can be compared with image data from a second image comprised in inside-curve source imagery. As one example, the first and second images may comprise adjacent images of the inside of the curve (e.g., that were collected at adjacent capture points along the curve of the roadway). As another example, the first and second images may comprise relatively consecutive images, where one or more intervening images may not have been included in the source imagery for the curve (e.g., due to being not valid for the panorama).

Figure 4:
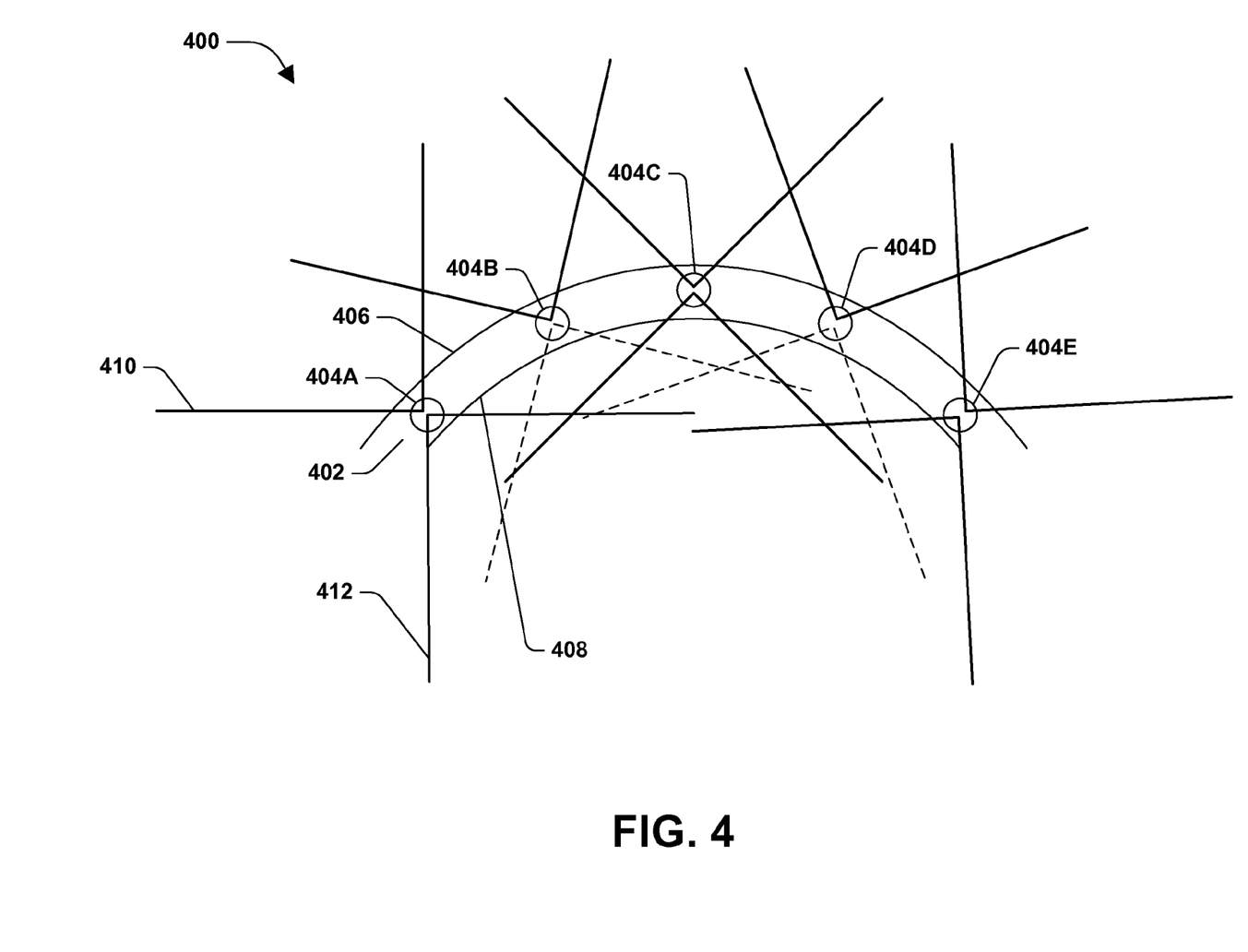
FIG. 4 illustrates an example embodiment where one or more portions of one or more techniques described herein may be implemented.

In one embodiment, the image data from the first image may be compared with the image data from the second image to determine if first image data covers the second image data (e.g., they comprise a desired amount of the same objects). As an illustrative example, FIG. 4 illustrates an example embodiment 400 where one or more portions of one or more techniques described herein may be implemented. In this example, a curved pathway 402 comprises an inside portion 408 and an outside portion 406. Further, respective observation locations 404 (A-E) may represent image capture locations, for example, where an inside-curve view 412 and/or an outside-curve view 410 may be captured in an image.

In this example 400, an inside-curve view 412 at observation location 404C comprises a field of view that may capture least a portion of (e.g., or all of) the objects that may be comprised in a field of view from the inside-curve view 412 at observation location 404B. That is, for example, adjacent images captured at these locations 404B, 404C may comprise some or all of the same objects, based at least upon the respective fields of view. Returning to FIG. 3, if the second image, image data is covered by the first image, image data (YES at 306), the first image can be selected for a set of planar panorama images 352, at 308, which may be used for creating a planar panorama image of the location of the curved pathway. That is, for example, if the first image comprises a desired amount of the image data (e.g., objects) that is found in the second image, the first image can be selected (e.g., and the second image may not be selected).

If the image data of the second image is not covered by the image data of the first image (NO at 306), the image data from the second image may be compared with a combination of image data from the first image, and image data from a third image, at 310. That is, for example, if the first image does not comprise a desired amount of the image data found in the second image (e.g., for producing a desirable user experience), at least a portion of the image data from the first image may be combined with at least a portion of the image data from the third image. In this example, the combined image data from the first and third images can be compared with the image data from the second image to determine if the combination comprises a desired amount of image data from the second image (e.g., the combination of the first and third images cover the second image).

As an illustrative example, in FIG. 4, the field of view of the inside-curve view 412 at observation location 404A (e.g., comprising the first image), may be combined with the field of view of the inside-curve view 412 at observation location 404C (e.g., comprising the third image). In this example 400, this combination covers the image data from the field of view of the inside-curve view 412 at observation location 404B (e.g., comprising the second image). Further, in one embodiment, the third image may comprise an image adjacent to the second image (e.g., or relatively consecutive to the second image), where the second image is adjacent to (e.g., or relatively consecutive to) the first image (e.g., the first image is on one side of the second image and the third image is on the other side of the second image).

Returning to FIG. 3, if the combined image data from the first and third images does not cover a desired amount of image data from the second image (NO at 312), the second image may be selected for the set of planar panorama images 352, at 314. However, if the combined image data from the first and third images does cover a desired amount of image data from the second image (YES at 312), the first and third images may be selected (e.g., and not the second image) for the set of planar panorama images 352, at 316. As one example, by selecting merely those images that cover a desired amount of image data for the inside of the curved pathway, and not selecting images that may comprise duplicate image data, the resulting set of planar panorama images 352 may be used to create a planar panorama image where distortions and/or undesirable artifacts may be mitigated.

As an illustrative example, in FIG. 4, a combination of the image data from inside-curve images (e.g., 412) captured at observation locations 404A, 404C and 404E may comprise the respective image data from inside-curve images captured at observation locations 404B and 404D. Therefore, as one example, the inside-curve images from 404B and 404D may not be included in the set of planar panorama images (e.g., 352), and merely the inside-curve images from 404A, 404C and 404E may be included in the set of planar panorama images.

Further, in one embodiment, source images from outside-curve source imagery may be selected for the planar panorama, where the outside-curve source imagery may be comprised in the curved path of the block of source imagery. As an example, an outside-curve image (e.g., 410), which may be captured at the respective observation locations 404 (A-E), can be included in the set of planar panorama images (e.g., 352), as the adjacent images may not comprise a sufficient degree of common or overlapping image data.

A system may be devised for identifying source images for use in creating a planar panorama of a pathway location, where the pathway comprises a curve. Image data from an image collected at an inside of the curve can be compared with image data from one or more other images of the inside of the curve to determine if they comprise common image data. If an image, or a combination of images, comprises a desired amount of common image data from another image, one or more images may be selected for inclusion in the planar panorama source images, while those one or more images that comprise common (e.g., overlapped) image data may not be included, for example.

Figure 5:
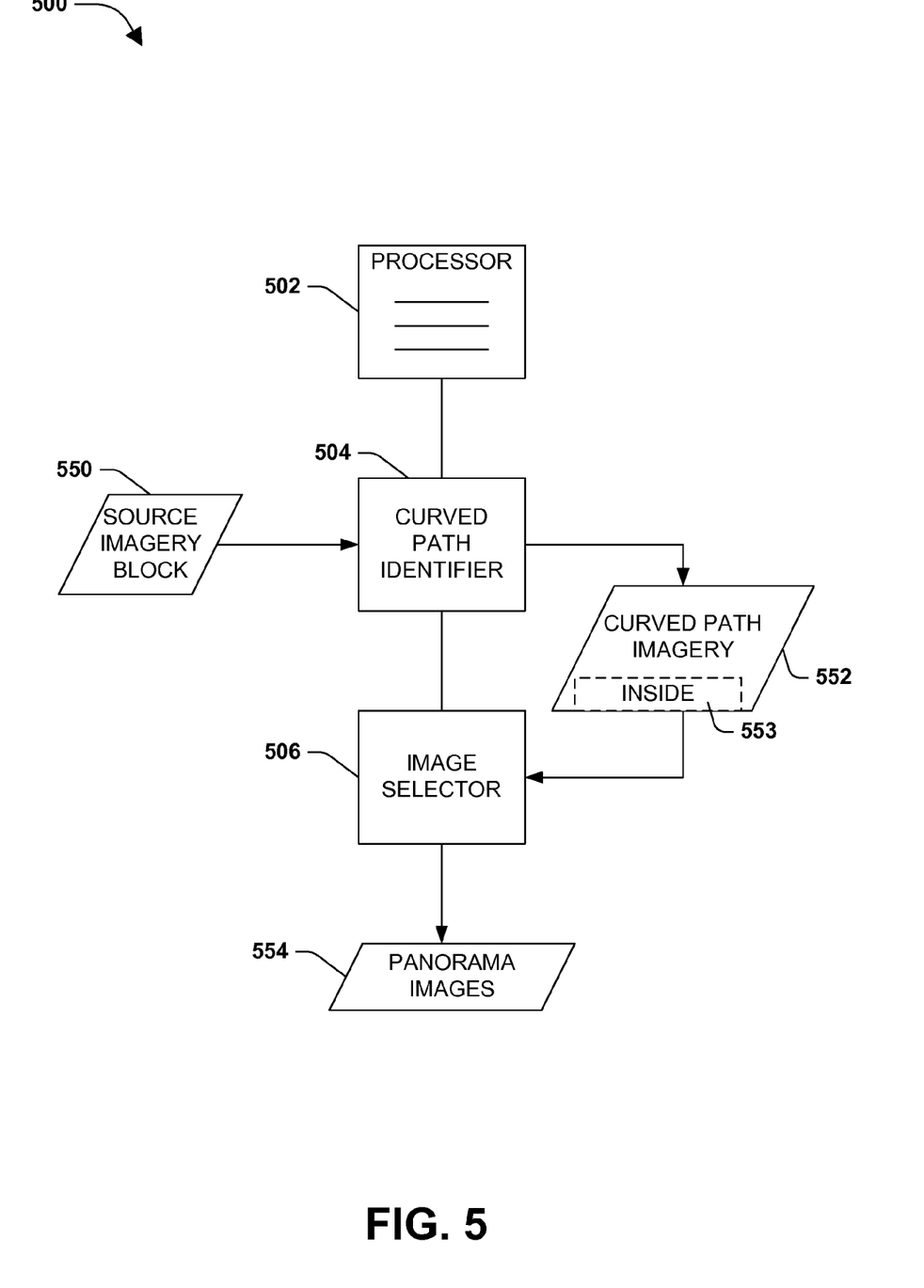
FIG. 5 is a component diagram illustrating an exemplary system for selecting source imagery for a planar panorama comprising a curved path.

FIG. 5 is a component diagram illustrating an exemplary system 500 for selecting source imagery for a planar panorama comprising a curved path. In the exemplary system 500, a computer-based processor 502, configured to process data for the system 500, is operably coupled with a curved path identification component 504. The curved path identification component 504 is configured to identify a curved path, comprising curved-path imagery 552, in a received block of source imagery 550. The curved path imagery 552 comprises inside-curve source imagery 553 (e.g., imagery from a side of the pathway comprising the inside of the curve).

In the exemplary system 500, an image selection component 506 is operably coupled with the curved path identification component 504. The image selection component 506 is configured to select a first source image from the inside-curve source imagery 553, for a set of images selected for a planar panorama 554, if image data from the first source image comprises image data in a second source image from the inside-curve source imagery 553. For example, if the first source image comprises a desired amount of image data that is common to the second source image, the first source image may be selected by the image selection component 506 for the set of images selected for a planar panorama 554 (e.g., while the second source image is not so selected).

Figure 6:
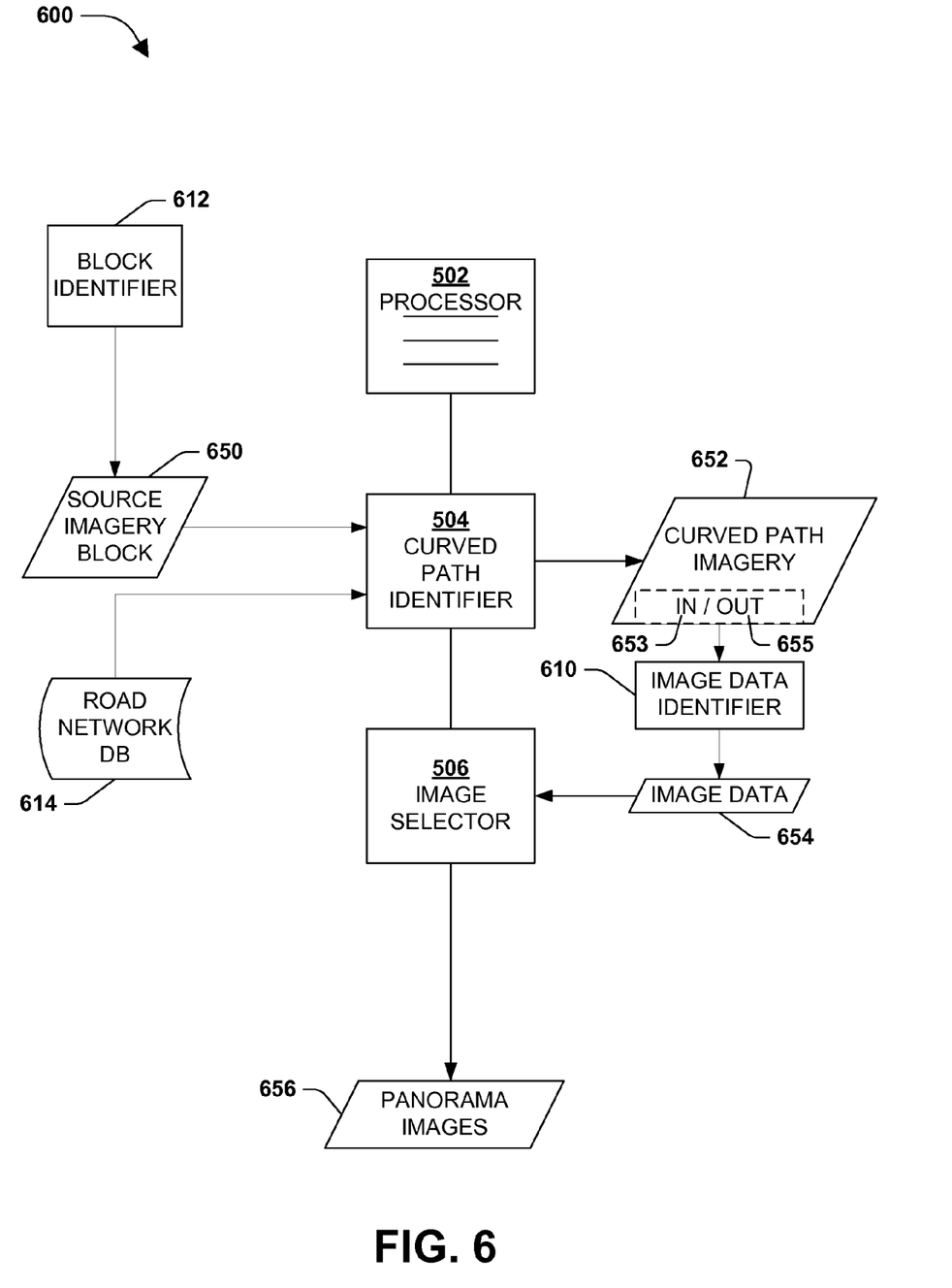
FIG. 6 is a component diagram illustrating an example embodiment where one or more portions of one or more systems may be implemented.

FIG. 6 is a component diagram illustrating an example embodiment 600 where one or more portions of one or more systems may be implemented. In this example 600, an extension of FIG. 5 is provided and thus description of elements, components, etc. described with respect to FIG. 5 may not be repeated for simplicity. In one embodiment, a block of source imagery 650 can comprise a plurality of sequential source images for an inside-curve of a curved path and a plurality of sequential source images for an outside-curve of the curved path.

In the example embodiment 600, a block identification component 612 can be configured to identify the block of source imagery 650 from source imagery for a location, where the block of source imagery 650 may comprise at least a section of a path without a bend exceeding a desired bend threshold. In one embodiment, the curved path identification component 504 can be configured to use a road network database 614 to determine whether the curved path is comprised in the block of source imagery 650.

In one embodiment, a first source image from inside-curve source imagery 653 of curved path imagery 652 may be captured at a first collection location, and a first source image from outside-curve source imagery 655 of curved path imagery 652 may also be captured at the first collection location. Further, a second source image from the inside-curve source imagery 653 may be captured at a second collection location, and a second source image from outside-curve source imagery 655 may also be captured at the second collection location, and so on.

As one example, at the first collection location (e.g., 404A of FIG. 4), an image may be captured of the inside (e.g., 412 of FIG. 4) and outside (e.g., 410 of FIG. 4) of the curve (e.g., left and right sides of the road). Further, in this example, at the second collection location (e.g., 404B of FIG. 4), an image may be captured of the inside and outside of the curve (e.g., and at a third location, a fourth, and so-on). That is, for example, a series of images can be collected of both sides of a roadway, where the images are captured at desired intervals (e.g., known locations) along the roadway (e.g., including the curve).

In the example embodiment 600, an image data identification component 610 may be configured to determine whether image data 654 comprised in a second source image is comprised in a combination of image data of a first source image and a third source image from the inside-curve imagery 653. In one embodiment, the image selection component 506 can be configured to select the third source image (e.g., in addition to the first source image) for the images selected for a planar panorama 656 if the image data 654 comprised in the second source image is comprised in the combination of the first source image and a third source image. If the image data of the second source image is not comprised in the combination, the second source image may also be selected for the planar panorama. That is, in one example, the first source image (e.g., but not the second source image) may be selected for the planar panorama if image data of the first source image comprises a sufficient degree of image data of the second source image. In one example, the first source image and the third source image (e.g., but not the second source image) may be selected for the planar panorama if image data from a combination of the first source image and the third source image comprises a sufficient degree of image data of the second source image. In one example, the first source image, the second source image and the third source image may be selected for the planar panorama if image data of the first source image, the third source image and/or a combination of the first and second source images do not comprises a sufficient degree of image data of the second source image.

Figure 7:
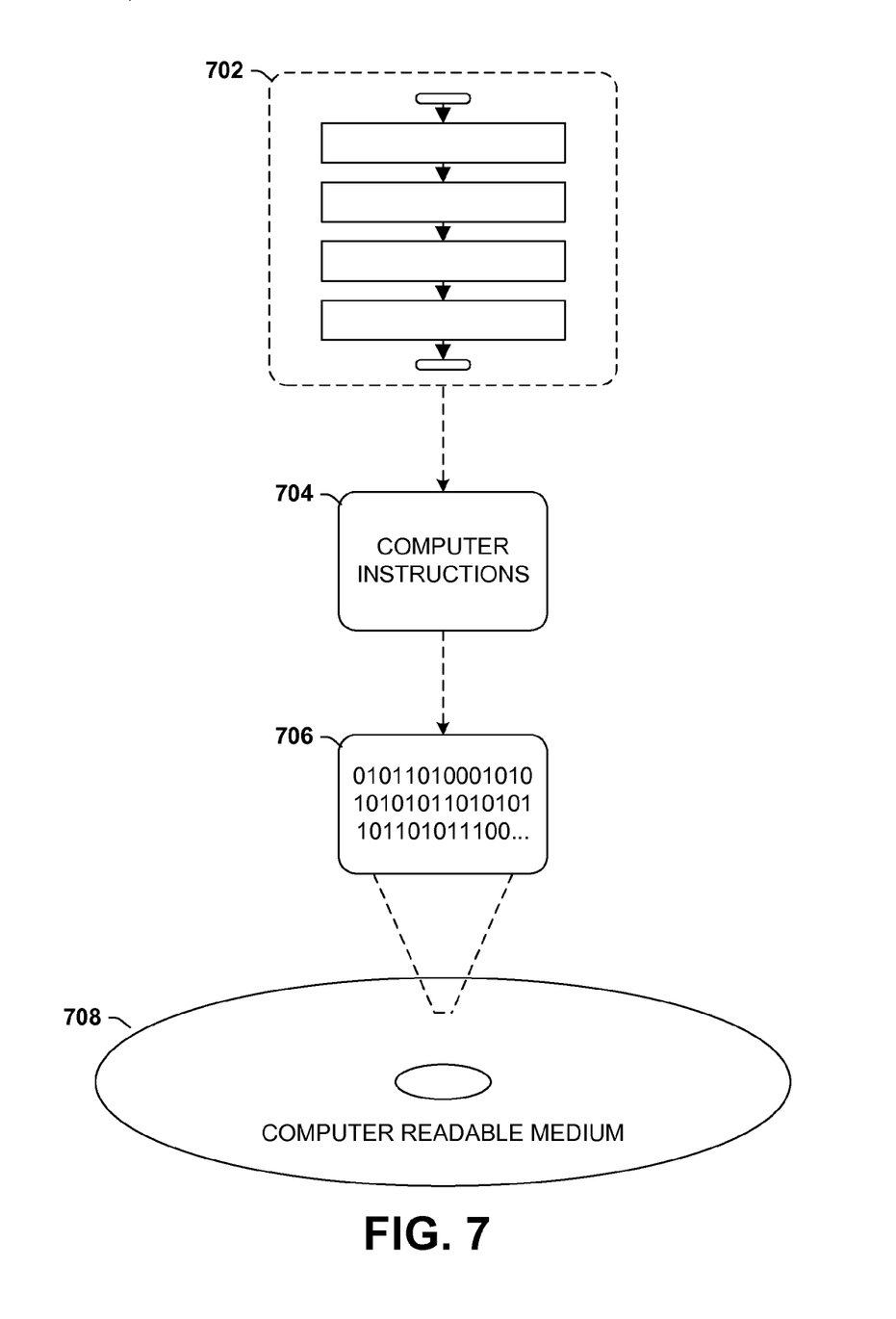
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
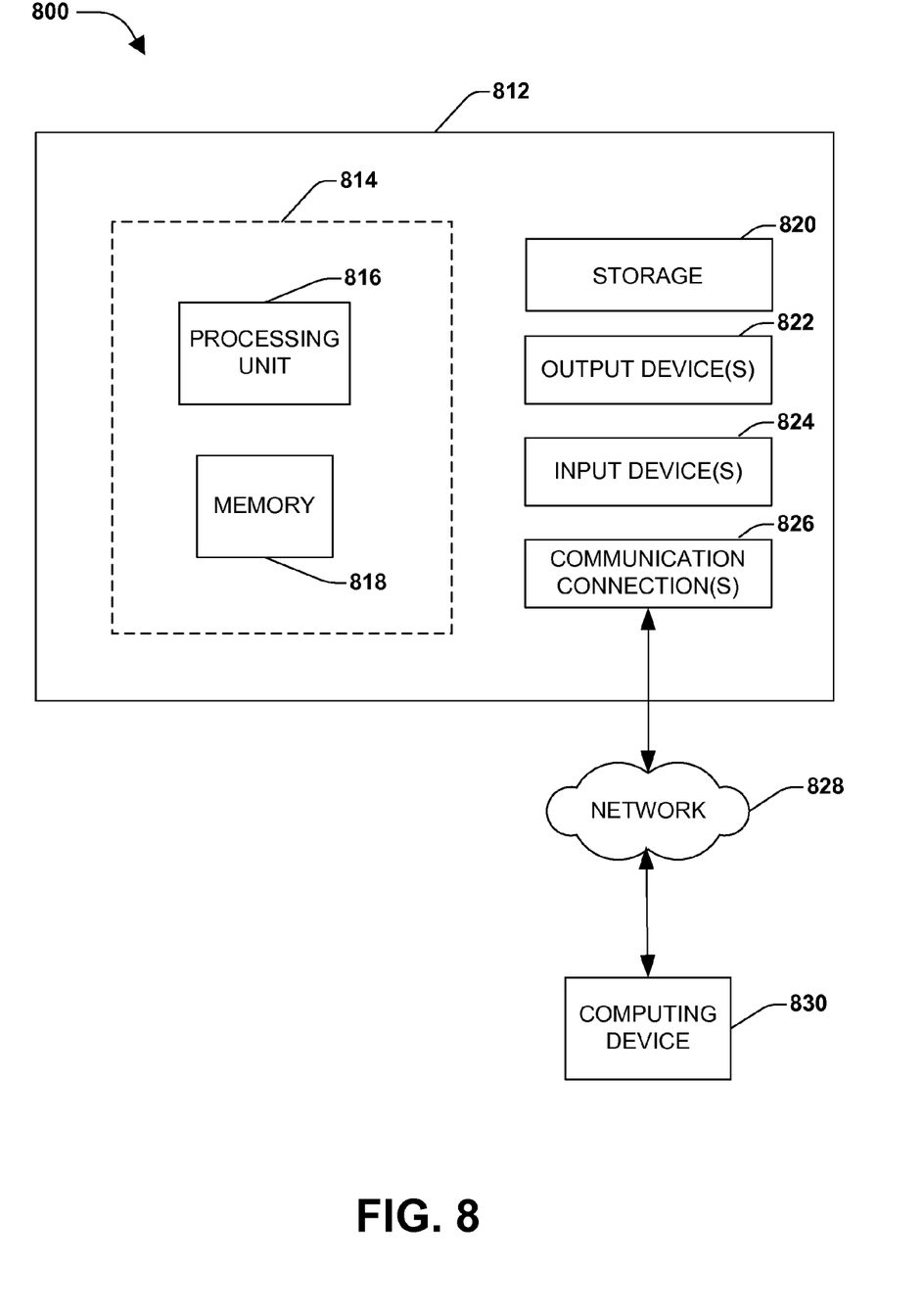
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for selecting source imagery for a planar panorama comprising a curved path, comprising:
   receiving a block of source imagery;
   identifying a curved path in the block of source imagery using a road network database, the curved path comprising inside-curve source imagery; and
   selecting a first source image from the inside-curve source imagery for the planar panorama if image data from the first source image is comprised in image data from a second source image from the inside-curve source imagery, at least a portion of the selecting performed by a processing unit.

2. The method of claim 1, comprising not selecting the second source image for the planar panorama.

3. The method of claim 1, comprising selecting a third source image from the inside-curve source imagery for the planar panorama if a combination of the image data from the first source image and image data from the third source image comprise the image data from the second source image.

4. The method of claim 3, comprising determining that the image data from the first source image combined with the image data from the third source image comprises the image data from the second source image.

5. The method of claim 1, comprising selecting source images from outside-curve source imagery for the planar panorama, the outside-curve source imagery comprised in the curved path in the block of source imagery.

6. The method of claim 1, comprising identifying the block of source imagery from source imagery for a location, the block of source imagery comprising at least a first section of a path without a bend exceeding a desired bend threshold.

7. The method of claim 6, comprising determining whether an identified bend in at least a second section of the path exceeds the desired bend threshold.

8. The method of claim 1, comprising validating one or more source images from the inside-curve source imagery and validating one or more source images from outside-curve source imagery comprised within the block of source imagery.

9. The method of claim 8, validating comprising determining whether a source image comprises image data valid for use in the planar panorama.

10. The method of claim 1, the road network database associated with a mapping application.

11. The method of claim 1, identifying comprising identifying the curved path in the block of source imagery using geo-location data comprised in the block of source imagery.

12. A system for selecting source imagery for a planar panorama comprising a curved path, comprising:
   one or more processing units; and
   memory comprising instructions that when executed by at least one of the one or more processing units implement:
      a curved path identification component configured to identify a curved path in a block of source imagery using a road network database, the curved path comprising inside-curve source imagery for an inside-curve of the curved path; and
      an image selection component configured to select a first source image from the inside-curve source imagery for the planar panorama if image data from the first source image is comprised in image data from a second source image from the inside-curve source imagery.

13. The system of claim 12, the block of source imagery comprising a plurality of sequential source images for the inside-curve of the curved path and a plurality of sequential source images for an outside-curve of the curved path.

14. The system of claim 12, one or more of:
   the first source image from the inside-curve source imagery and a first source image from outside-curve source imagery captured at a first collection location; or
   the second source image from the inside-curve source imagery and a second source image from the outside-curve source imagery captured at a second collection location.

15. The system of claim 13, a first side of the planar panorama comprising a combination of one or more source images from the inside-curve, and a second side of the planar panorama comprising a combination of one or more source images from the outside-curve, the first side comprising fewer combined source images than the second side.

16. The system of claim 12, the instructions, when executed, implementing an image data identification component configured to determine whether image data comprised in the second source image is comprised in a combination of the image data from the first source image and image data from a third source image from the inside-curve source imagery.

17. The system of claim 16, the image selection component configured to select the third source image for the planar panorama if the image data comprised in the second source image is comprised in the combination.

18. The system of claim 12, the instructions, when executed, implementing a block identification component configured to identify the block of source imagery.

19. The system of claim 12, the road network database associated with a mapping application.

20. A computer readable storage medium comprising computer executable instructions that when executed perform a method for selecting source imagery for a planar panorama comprising a curved path, comprising:
   identifying a curved path in a block of source imagery using a road network database, the curved path comprising inside-curve source imagery; and
   selecting a first source image and a third source image from the inside-curve source imagery for the planar panorama if image data from a combination of image data from the first source image and image data from the third source image is comprised in image data from a second source image from the inside-curve source imagery.

* * * * *